July 29, 1924.
D. CAMPBELL
VEHICLE LAMP
Filed Dec. 18, 1922    2 Sheets-Sheet 1
1,503,114
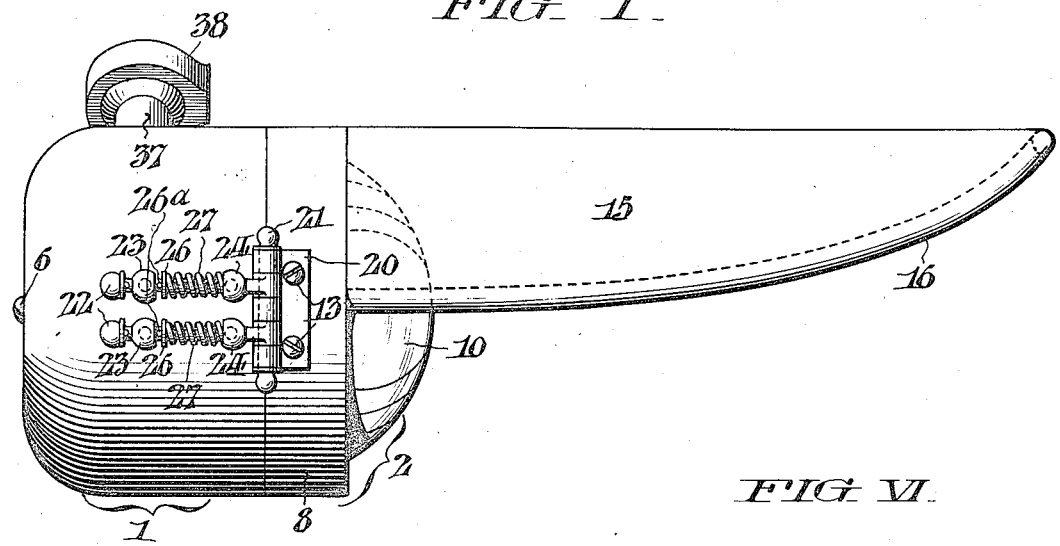
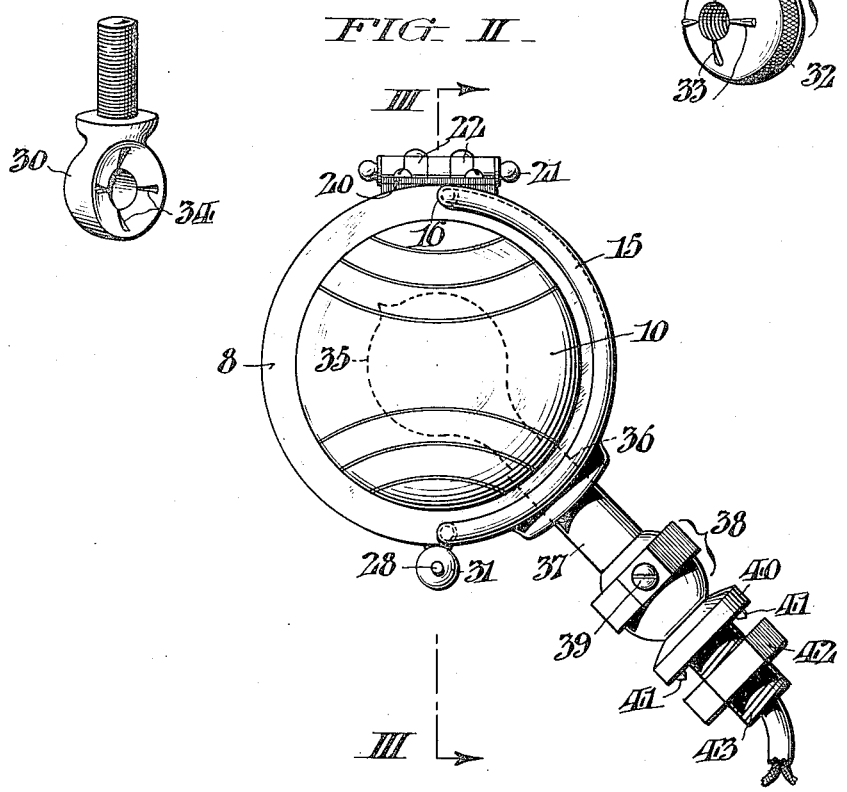
WITNESSES:
John C. Bergner
Alfred E. Tschinger
INVENTOR:
Daniel Campbell,
BY Fraley & Paul
ATTORNEYS.

July 29, 1924.
D. CAMPBELL
VEHICLE LAMP
Filed Dec. 18, 1922
1,503,114
2 Sheets-Sheet 2
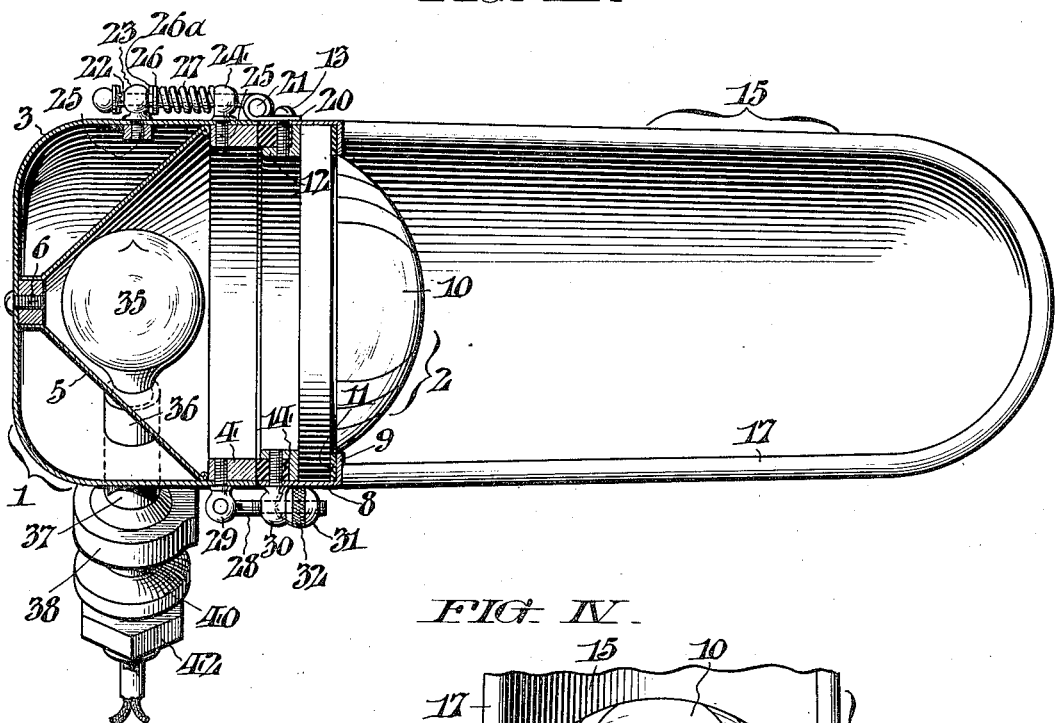
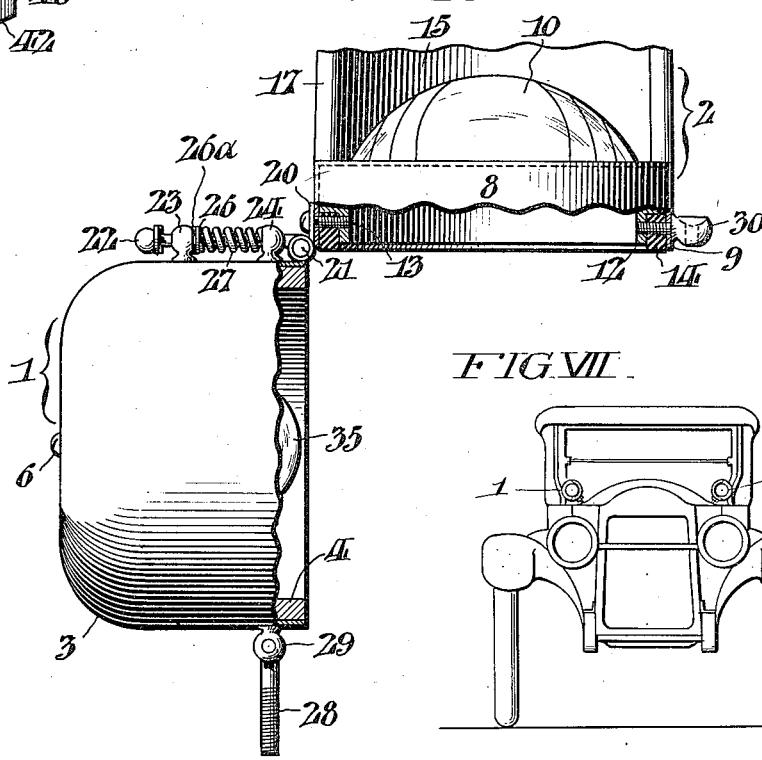
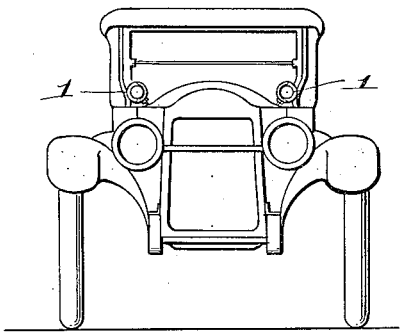
WITNESSES:
John E. Bugner
Alfred E. Lchinger
INVENTOR:
Daniel Campbell,
BY Fraley Paul
ATTORNEYS.

Patented July 29, 1924.

1,503,114

UNITED STATES PATENT OFFICE.

DANIEL CAMPBELL, OF PHILADELPHIA, PENNSYLVANIA.

VEHICLE LAMP.

Application filed December 18, 1922. Serial No. 607,541.

*To all whom it may concern:*

Be it known that I, DANIEL CAMPBELL, a citizen of the United States, residing at Philadelphia, in the county of Philadelphia, State of Pennsylvania, have invented certain new and useful Improvements in Vehicle Lamps, of which the following is a specification, reference being had to the accompanying drawings.

My invention relates generally to lamps for motor vehicles, and more particularly to a type useful as auxiliaries to the main or head lights ordinarily employed, to indicate to approaching traffic by different colors the right and left hand sides of the vehicle.

An object of the invention is to provide such location indicating lights with shading devices for the purpose of aiding the drivers of head on approaching vehicles in avoiding each other and to regulate the right of way to intersecting traffic, in a manner which will be fully explained as the description of the invention proceeds.

My invention is further directed to render vehicle lamps with movable closure members or sections, water and weather-tight; to insure the closure members against accidentally opening under the constant jarring and vibration incidental to vehicle travel; and to provide for universal adjustment of the lamps in positioning them initially upon the vehicle.

Other objects and attendant advantages will be apparent from the detailed description of a typical embodiment of my invention which follows, while its scope will be as readily understood from the appended claims.

In the drawings Fig. I is a plan view of a lamp structure conveniently typifying my invention.

Fig. II is a front view of the same.

Fig. III is an axial sectional elevation of the structure taken as indicated at III—III in Fig. II.

Fig. IV is a view partly in section and partly in elevation showing the cover section which serves as a holder for the projecting lens, in open position; and Figs. V and VI are detail views in perspective, representing certain parts comprised in the means for locking the cover section of the lamp in closed position.

Fig. VII is a diagrammatic view illustrative of the application of my invention to an automobile.

In these illustrations, the body section of the lamp is comprehensively indicated by the numeral 1, and has associated with it a cover member 2 which is movable, as will later be explained, to permit access to the interior of the body section for bulb replacement or for cleaning as may be found necessary. The body section 1, it will be observed, is generally cylindrical in form with its back well rounded as at 3 to avoid sharp projecting edges. Near its forward end the body section is reinforced by an internal ring 4, which may be soldered, welded, or otherwise secured in place after insertion of the reflector shown at 5. This reflector 5 is preferably conical in form, as represented, and secured solely by a headed screw 6 engaging an embossment projecting rearwardly from the vertex of the cone, said screw passing from the exterior through a central aperture in the back of the body section 1 of the lamp.

Coming now to the cover section 2, it will be observed that the latter comprises a rim 8 with an inwardly projecting annular flange 9 for retainment of the projecting lens indicated at 10, a gasket 11 being interposed to prevent entry of water along the contacting surfaces. This lens 10 is held in place by an annulus 12 having, as best seen in Fig. III, a right annular cross section, and held in place by one or more screws 13. The annular space between the shell or rim 8 and the horizontal flange of the annulus 12, affords a seat for retainment of a resilient gasket 14 of rubber or the like. This gasket 14 thus interposed between the cover section 2 and body section 1 contacts with the exposed face of the reinforcing ring 4 for water-tight sealing of the cover section. Forming part of the cover section 2 and preferably attached to the rim member 8 is a screen or shade 15. This screen or shade as particularly observable from Figs. II and III, is of semi-circular cross section, extending well forward of the lens 10 at the inboard side of the latter when the lamp is properly applied to a vehicle "v"—Fig. VII, its front end being gradually curved toward the point of its termination. As best seen at 16 in Fig. I the perimetrical edge of the screen 15 is turned inward to form a rolled bead 17 which adds to the ornamental appearance and at the same time enhances the rigidity of said screen. The lens 10 is of a type capable of projecting light both forward and laterally, and, when lamps of this character are used as signals in connection with vehicular travel, the lenses of a pair of lamps are differently colored, the colors being arbitrarily selected, as for instance, red and green, for use respectively, at the left and right hand sides of the vehicle. The concave surfaces of the screens are preferably colored to correspond to the color of their associated lenses.

In order to maintain the sealing gasket 14 at all times in water-tight compression against the cooperative face of the reinforcing ring 4, I have provided a novel form of hinge which, as best seen in Figs. I, III and IV, includes a leaf member 20 in the instance shown as attached by certain of the screws 13 to the rim 8 of the cover member. This leaf 20 carries the hinge pintle 21 whereto are pivoted one or more rearwardly extending rods 22 which are slidably supported in lugs or projections 23, 24 secured to the body section 1 of the lamp structure. These lugs or projections 23, 24 are preferably given the ornamental form indicated, with spherical heads appropriately pierced for traverse of the rods 22 and provided with integral shanks 25 Fig. III for threaded engagement with the lamp body. Washers 26 are mounted upon the rods 22 abutting against pins 26ᵃ extending through said rods, and helical springs 27 are also embraced about the rods and interposed between the lugs 24 and said washers 26 to urge the hinge pintle 21, and therefore the cover 2, toward the body section of the lamp, thereby affecting compression of the sealing gasket 14 as aforesaid.

At the region of the lamp diametrically opposite the hinge organization just described, I have provided a cooperative locking means which includes a bolt 28 which is pivotally attached to a lug 29 corresponding generally in appearance to the lugs 23, 24 aforementioned. The lug 29, as shown in Fig. III, is secured directly to the body section 1 of the lamp, and the attached bolt 28 traverses a similar apertured lug 30 projecting from the cover section 2. To the protruding threaded end of the rod 28 is mounted a nut 31 having a roughened or milled band 32 for convenience of finger manipulation. Said nut (see Figs. V and VI) is preferably made spherical in form and engages with a correspondingly configured seat in the outer face of the lug 30. Said nut 31 furthermore, as best shown in Fig. VI, has a series of radial cam ridges 33 adapted to engage with corresponding recessions 34 in the seat of the lug 30 see Fig. V. Thus the nut 31 will yield to forced rotation while the cover section 2 of the lamp is being secured, but the interlocking of the ridges 33 within the depressions 34 will prevent subsequent free rotation so that the cover cannot possibly become loose through vibrations and jars induced incidentally to vehicular travel.

Illumination in the present instance, I effect by use of an electric bulb indicated in the drawings at 35, the said bulb being supported in an appropriate socket 36 to which the conductors for the current are led through a neck 37 entering the body section 1 at an angle as best apparent from Figs. II and III. This neck 37 forms a part of the supporting bracket for the lamp, and a ball and socket joint 38 is interposed to permit angular adjustment of the lamp during initial mounting, such adjustment being temporarily fixable by means of a screw 39 which is tapped into the socket and bears against the ball. After the adjustment is made the screw is removed and an opening drilled into the ball at the proper place and the screw subsequently reinserted therein to permanently hold the lamp in fixed relation to the vehicle. The socket member of the joint is flanged at 40 as to afford a comparatively extended surface which serves as a shoulder against the outer face of the cowl or other portion of the vehicle to which the lamp structure is to be attached. The flange 40 has projecting prongs 41, which, during the tightening of the nut 42 on the threaded shank portion 43, of the socket member, is forced into the metal of the cowl clamped between the flange 40 and nut 42. The institution of this provision will obviously prevent displacement of the lamp after the latter has been once secured.

The lamps are used in pairs, one located at each side of a vehicle "v"—Fig. VII, mounted preferably upon the cowl and spaced apart to as great a distance as may be convenient. In positioning the lamps the shades 15 are located inboard or at the inner side of each lamp so that one lamp is shaded from the other. As above intimated when thus used the lenses of the lamps of a pair are differently colored, the lens at the right of the vehicle being preferably the green one and that upon the left the red; the locations being considered those observed by the driver of the vehicle, which will be reversed of course as viewed by an approaching driver. The location of the lights when known will serve to indicate the right and left sides of the vehicle.

It will thus be apparent that the light rays from each lamp 1, 1 may be cast directly forward and to the outer side of the vehicle "$v$"—Fig. VII through a horizontal arc of ninety degrees. Assuming that two vehicles are approaching each other head on both equipped with my improved lights, it will be noted that to each driver both the red and the green lights will be visible, and will continue to be visible as the vehicles approach until they swerve to pass each other, whereupon the lights at the mutually remote sides of the vehicles (or the green lights) will be shaded by the shades 15 to each driver who will then only see each other's red light. This fact will indicate that they have changed their relative positions from head on approach to parallel approach, and as the vehicles near one another ample opportunity is given each to provide as much clearance between as possible. The arrangement is also operative in the case of intersecting approach to dictate the right of way. In this instance only one of the lights will be visible to each driver. The one observing the green light on the other will take the right of way and the one observing the red light on the other will let the latter pass. If this rule is observed uniformly confusion and accidents will be avoided. The shades 15 being colored by painting function during daylight in lieu of the lights to indicate the right of way to intersecting traffic.

Having thus described my invention, I claim:

1. The combination in a motor vehicle of spaced signals, means shading against observation from either side of the vehicle of more than one signal at a time, and automatically extensible hinge connections therefor with the pintles supported for independent shifting and subject to yielding means.

2. The combination in a motor vehicle of spaced signal lights, means shading against observation from either side of the longitudinal axis of the vehicle and at a point in advance thereof of more than one signal light at a time, and an automatically extensible hinge connection for each light and shading means with the pintle thereof supported for independent shifting and subject to yielding means.

3. A lamp structure of the character described with a screen extending forward of the lamp body at the inboard side of the latter, said screen having a concave surface for reflecting light so as to be visible as a signal from the side of the vehicle, and an automatically extensible hinge connection therefor with the pintle supported for independent shifting and subject to yielding means.

4. A lamp structure comprising a main or body section, a cover section having a relatively long forwardly directed shade adapted to laterally project the light rays emitted from the lamp, a sealing gasket interposed between said sections, and an automatically extensible hinge connection between said body and cover section with the pintle thereof supported for independent shifting and subject to yielding means.

5. A lamp structure comprising a main or body section, a cover section, a sealing gasket interposed between the said sections, and an automatically extensible hinge with its pintle supported for independent shifting and subject to yielding means whereby the cover section is maintained in water-tight contact with the sealing gasket.

6. A lamp structure comprising a main or body section, a cover section, a sealing gasket interposed between the said sections, and an automatically extensible hinge including a member rigidly secured to one of the lamp sections and affording a pivotal connection for a cooperative member slidably supported by the other of the lamp sections, and yielding means operative upon the latter hinge member to maintain the cover section in water-tight contact with the sealing gasket.

7. A lamp structure comprising a main or body section, a cover section, a sealing gasket interposed between the said sections, and an automatically extensible hinge including a member rigidly secured to one of the lamp sections, a slide rod pivotally connected to said member, guides for the slide rod supported by the other lamp section, and a spring operative upon the rod for maintaining the cover section of the lamp in water-tight contact with the sealing gasket.

8. A lamp structure comprising a body section, a hinged cover section, and securing means for the cover section including a bolt pivotally attached to one of the lamp sections, an apertured lug on the other of the lamp sections through which the bolt extends, and a clamp nut for engaging the protruding threaded end of the bolt, said nut having a spherical face cooperating with a correspondingly configured seat in the lug aforesaid, and cam projections engageable within depressions in the seat yielding only to forced rotation of the nut.

9. A vehicle lamp with an elongated shade connected thereto by an automatically extensible hinge with the pintle supported for independent shifting and subject to yielding means, laterally disposed bracket for supporting said lamp from the vehicle body, said bracket having an interposed universal joint for adjusting the position of the lamp, a threaded shank for engagement of a securing nut, and a shoulder flange with projecting prongs opposing the nut to clamp the metal of the body therebetween and to secure the bracket and the supported lamp against subsequent displacement.

In testimony whereof, I have hereunto signed my name at Philadelphia, Pennsylvania, this 14th day of December, 1922.

DANIEL CAMPBELL.

Witnesses:
JAMES H. BELL,
E. L. FULLERTON.